Oct. 19, 1943.  E. H. FRENCH  2,332,215
DISTILLATION APPARATUS
Original Filed Aug. 5, 1937   3 Sheets-Sheet 1

FIG. 1.

INVENTOR
Edward H. French

Oct. 19, 1943.  E. H. FRENCH  2,332,215
DISTILLATION APPARATUS
Original Filed Aug. 5, 1937   3 Sheets-Sheet 2

INVENTOR
Edward H. French

Patented Oct. 19, 1943

2,332,215

UNITED STATES PATENT OFFICE 2,332,215

DISTILLATION APPARATUS

Edward H. French, Columbus, Ohio

Original application August 5, 1937, Serial No. 157,561. Divided and this application October 15, 1941, Serial No. 414,993

17 Claims. (Cl. 196—128)

This invention relates to the distillation of liquids and liquid mixtures; and particularly those organic liquid mixtures containing components that are sensitive to heat utilized in connection with their recovery and/or purification, thereby being at least partially decomposed at high temperatures with the production of color bodies of complex structure. While the invention is highly serviceable in connection with the flash-vaporizing type of distillation processes described in my U. S. Patents Nos. 1,394,488 and 1,997,171, it has special utility for the distillation of such mixtures as "liquid rosin," and the so-called "tallol" (a mixture containing abietic, oleic, and linoleic acids, turpentine, phytosterol and other organic compounds) mentioned in the last-named patent. It is, however, highly efficacious in distilling petroleum oils, and particularly the lubricating fractions thereof, and used lubricating oils such as "crank-case oils" which contain organic compounds of high molecular weight that are decomposed readily when exposed to high temperatures and pressures for prolonged periods of time.

Among the more important objects of the invention are the following: to provide for the distillation in novel manner of organic liquids readily decomposable by heat, while preventing substantial decomposition thereof; to provide a novel distillation unit adapted for effective use in a spray-vaporizing type of distillation process, making commercially possible the purification and recovery, undecomposed, of complex mixtures of heat-sensitive organic products, such as the liquid rosins produced in pulp and paper mills, even where, because of the relatively small amounts of rosin and fatty substances available for distillation, expensive installations such as those used in the petroleum industry would not be practical. These and other objects will be apparent from the following description of my invention.

Heretofore, in distilling lubricating oils, liquid rosin, and other mixtures of heat-sensitive materials, it has been necessary, in order to avoid cracking or decomposition of these compounds, to reduce by means of various partial pressure effects the temperature at which they distill. This effect usually has been produced by the aid of a vacuum, or by the introduction of an inert gas into the still. In petroleum distillation this effect usually is secured by superheated steam.

In modern oil distillation practice the oil is preheated in a tube still and is flash vaporized in the presence of superheated steam in a chamber, from which the gases pass into a bubble-cap column, and from the latter into a dephlegmating column, and thence into condensers, the residual vapors then flowing to the "tail house." All of such systems as designed are large and expensive distillation units. In the crude starting materials are impurities consisting of suspended non-distillable bodies that must be removed. When the highly heated crude material is atomized into the still these impurities exist in very finely divided state, and so are carried forward by the vapors into the dephlegmating column and condensers, thereby contaminating the finished product unless removed in the said column. In oil refining, these bodies usually are removed in a bubble-cap type column. The latter must be heated by superheated steam or other vapor to prevent premature condensation of the oil before these tarry bodies are washed out in the lower sections of the column. In washing out these bodies the column restricts the free flow of the vapors in order to pick up the finely divided mist of tarry bodies in the liquid present in the column. The liquid in each section retards the free flow of vapors through the column, thus increasing the time during which the vapors remain in the still. In each section there is a violent agitation of the liquid and vapors, due to vapors passing through liquid. This is especially true when a vacuum is used. This countercurrent intermingling of liquids and vapors also definitely increases the time that the vapors are in contact with the liquid containing the impurities.

Applicant has frequently observed that when distilling solutions of many complex organic compounds that are highly sensitive to heat, such as lubricating fractions of mineral oils, "tallol," etc., dissolved in solvents such as kerosene, gasoline, etc., the use of a dephlegmating column causes color bodies and impurities to be formed and to follow through and appear in the resultant condensate. Applicant has now discovered that, by the use of the apparatus hereinafter described, which avoids substantial countercurrent contact of vapors and liquids, and provides free passage for the vapors through a still and associated condensers while removing entrained liquids at high temperatures, any color bodies and impurities formed are prevented from flowing with the vapors from the still to the condensers and appearing in the finished product.

According to one modification of the present invention, means are provided whereby the liquid mixture to be distilled and refined is dissolved in a suitable solvent; and the resultant solution, preferably after filtration or other treatment to remove any substances thereby precipitated, is preheated to a temperature below that at which decomposition of the liquid components occurs. The preheated liquid or solution then is spray vaporized or atomized within a still maintained at a temperature at which, under the pressure conditions existing therein, the liquid is quickly vaporized. The resultant vapors promptly thereafter pass into intimate contact with a mass of inert contact material maintained at approximtely the temperature of the still, the said contact material preferably consisting of a mineral wool or glass wool so loosely packed that it offers little or no resistance to the passage therethrough of the vapors. The liquid particles in the vapors or mist are deposited or coalesce upon the surfaces of this inert material, while the true vapors freely pass therethrough. The arrangement of parts preferably is such that the fluids flow downwardly through the scrubber material. Within the scrubber, or immediately upon leaving the latter, the vapors change direction sharply, while still being maintained at substantially their distillation temperature, whereby any coalesced liquid particles still present therein are thrown out. The vapors then flow quickly from the still to the first of a series of condensers. In each of the latter the vapors flow downwardly, different fractions thereof being condensed in the respective condensers depending upon the conditions maintained therein, and upon the nature of the vapors being condensed, and are withdrawn from the bottom of the condenser in which condensed.

In the practice of the invention according to one modification, means are provided for maintaining the still and condenser system under high vacuum to facilitate operation of the still-scrubber unit at a temperature at which, during the extremely short period of existence of the vapors at such temperatures, no decomposition of the heat-sensitive materials occur, even in the presence of the highly heated contact materials mentioned. According to another modification, means are provided for introducing an inert gas such as carbon dioxide, nitrogen, natural gas, methane or hydrogen into the still with the atomized solution in order to facilitate the distillation of the solution at temperatures sufficiently low to prevent decomposition of the organic compounds. The advantage of this partial pressure effect may be secured in operations conducted under atmospheric pressure as well as under vacuum.

To illustrate such modification, a petroleum oil to be refined such as in crude petroleum or a used lubricating grade of hydrocarbon oil, preferably after filtration or other treatment to remove insoluble material, is preheated to an elevated temperature below that at which decomposition occurs, and preferably below about 570° F. The preheated oil then is spray-atomized into a still within a flowing stream of a suitable highly heated gas which is substantially inert or resistant to decomposition at the oil distillation temperature, such as methane, natural gas or nitrogen. The inert gas is at a temperature which may be sufficiently high to superheat the preheated oil entering the still. The still may be under approximately atmospheric pressure, and at a temperature at which the oil is quickly vaporized within the body of hot inert gas. The resultant vapors promptly contact a coalescing and stripping means hereinafter described which is maintained at approximately the distillation temperature of the oil. Unvaporized oil particles are coalesced and separated from the mixed vapors and gases under conditions whereby countercurrent flow of the stripped vapors and the coalesced material is prevented. The stripped vapors then flow through a series of condensers such as hereinafter described and are fractionally condensed, the lubricating fractions being separately recovered. The uncondensed carrier and heating gas is withdrawn from the last condenser, and is reheated and recycled to the still under a selected uniform pressure and flow rate. The centrifugal type of scrubbing means shown in Fig. 5 of the accompanying drawings preferably is used when distilling hydrocarbon oils or other liquids at pressures around atmospheric or above, using circulating heating and carrier gas.

It is important in the practice of the present invention that coalescence of the liquid and solid particles present in the spray or mist delivered within the still be effected promptly after the spraying operation, by suitable means, such as a contact mass which itself is at a temperature substantially that of the mixed vapors, so that such coalescence is accomplished while condensation of all vapors is prevented. The contact mass in the scrubber should be so arranged as to offer substantially little or no resistance to the downward flow of the vapors therethrough. The subsequent sharp change of direction of the rapidly flowing vapors assists to separate therefrom any traces of liquids and solids coalesced in the scrubber or dripping from the latter. No true filtering action is manifested.

The invention will now be illustrated in connection with the production of resin and fatty acids of high purity from alkaline pulping liquors produced in the pulping of wood, such as is described in my United States Patent No. 1,997,171. These alkaline pulping liquors, containing resins and oily substances in the form of their water-soluble salts or soaps are treated with an acidic substance such as a mineral acid or an acid gas. The rosin and fatty acids, etc., are then dissolved in a suitable solvent, such as gasoline, kerosene, naphtha, or gas oil. Preferably the solvent is immiscible with water. If desired the solution of rosin and oily substances may be then treated in the cold with strong sulphuric acid to remove objectionable unsaturated compounds in well-known manner, following which the residual acid and water soluble reaction products are washed from the solution of rosin with water. The solution is then filtered in the cold to remove precipitated matter or "nigger" therein.

In forming the aforesaid solution it is preferred to employ around 4 or more parts by weight of the solvent to each part by weight of the mixture of rosin and oily substances or fatty acids. Under these conditions certain objectionable color and odor-producing bodies deposit from the solution and are removable, even prior to the sulphuric acid treatment of the solution when such treatment is used.

The filtered solution is then heated by suitable means to a temperature sufficiently high to vaporize the volatile constituents at the pressure existing in the distillation zone, but below the temperature at which substantial cracking and decomposition of the volatilized components can occur under the conditions of operation. When utilizing the present flash-vaporizing process and maintaining the still under a vacuum of 28 to 29 inches of mercury, the solution is preheated to a temperature below around 315° C., and preferably around 250–260° C. The initial stage of the preheating preferably is accomplished by heat exchange with the vapors leaving the still, being effected in a series of condensers so regulated that the liquid being preheated acts successively to condense the rosin, fatty acids, and the solvent.

The thus preheated solution is forced under pressure through a spray nozzle into a distillation chamber or zone which by appropriate means is maintained at a temperature preferably within the range from 245–275° C., or approximately that of the preheated solution, the conditions being so adjusted by use of vacuum or by the introduction of an inert gas that the solution is instantly vaporized. The vapors are quickly removed from the distillation zone substantially as rapidly as formed, passing downwardly through the hot scrubber or equivalent means provided for coalescing minute particles of unvaporized materials and separating them from the vapors while maintaining the latter at the said high temperatures.

The quick removal of the stripped vapors from the high temperature zone as rapidly as formed is secured by maintaining sufficient voids in the mass of fibrous scrubber material, when this type of device is used, to allow free passage of the vapors, while maintaining a high vacuum and a regulated rapid flow of vapors to the condensers.

An important feature of the invention resides in the location within the high-temperature zone of the still, or of the furnace, of the scrubber or equivalent means for removing entrained matter from the vapors. This prevents sufficient loss of heat by the high-boiling vapors to cause the conversion of any portion thereof to liquids, since such liquids will not absorb enough heat in the system thereafter to be revaporized unless superheated solvent is introduced into the still to supply further heat, or unless the requisite partial pressure effect is otherwise secured.

The vapors leaving the still are fractionally condensed in a series of condensers, in each of which the vapors and condensate passing therethrough flow downward. This serves the important purpose in the present process of effectively condensing the vapors promptly and removing the condensate from the uncondensed vapors while permitting the free uninterrupted flow of the latter in a manner that does not reduce the effectiveness of the main vacuum pump for continuously holding a selected high vacuum in the system. In a preferred modification of the process the solution flowing to the still for flash-vaporization is used as the heat-exchange fluid in the condensers; in which it flows in a direction countercurrent to the flow of vapors being condensed, but out of direct contact therewith.

In the accompanying drawings, which illustrate certain apparatus features of the invention particularly adapted for the flash-distillation of organic liquids containing heat-sensitive components—

Figure 1:
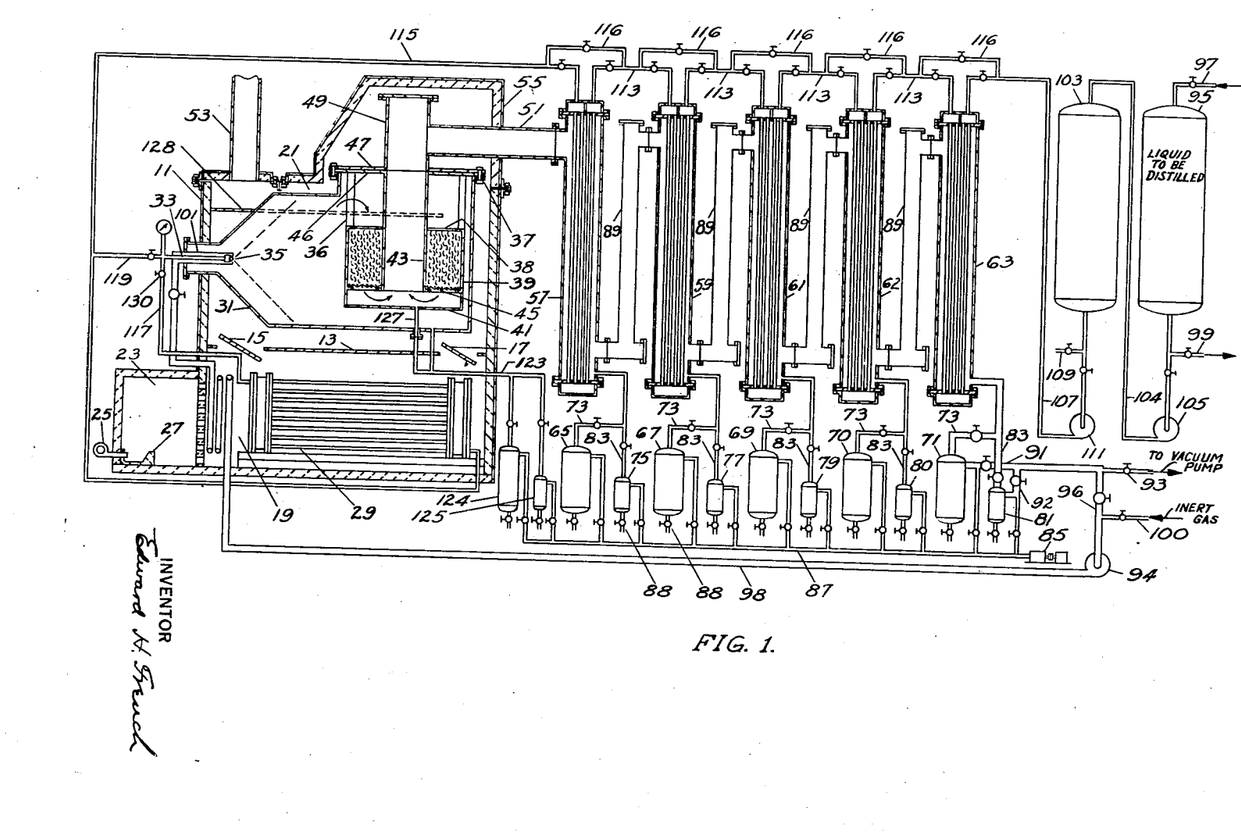
Fig. 1 is a somewhat diagrammatic view of a still and condenser system, parts being shown in section.

Referring particularly to Fig. 1 of the drawings, numeral 11 designates a furnace or still housing, constructed of or lined with heat-refractory material. A suitable baffle 13, having openings therein at the respective front and rear ends of the furnace, controlled by dampers 15, 17, divides the interior of the housing into a lower preheating chamber 19 and an upper heating chamber 21. A combustion chamber 23 provided with suitable burners 25 and a deflecting baffle 27, is arranged to discharge hot combustion gases over and around the tubes of a heat-exchanger 29 disposed within the chamber 19.

Longitudinally disposed within the chamber 21 is a distillation vessel or still 31, preferably made of or lined with a corrosion-resistant alloy such as stainless steel, nickel, or Monel metal, as hereinafter described. The end of the still adjacent the front end of chamber 21 constitutes an atomizing chamber and has sloping side walls terminating in a central neck provided with an end closure plate through which extends a liquid inlet line 33, provided with an atomizing nozzle 35. Removably mounted within the opposite end of the still 31, and suspended by spaced supporting members 36 from flanged margins 37 surrounding an opening in the upper wall of the still, is a scrubber vessel 38 of metal, having side walls 39 and an imperforate bottom 41. The interior of the scrubber is in free communication at all times at its upper end with the interior of the still, as shown, and contains a mass of loosely-packed, solid, inert contact material such as fibrous mineral wool. The scrubber has a central, vertically-disposed vapor outlet conduit 43 extending downward to a point near the bottom 41. An annular foraminous member or screen 45 is supported upon the lower margin of conduit 43 and the adjacent portions of side wall 39. The upper end of conduit 43 terminates in a flat cover plate 46 that forms a flanged seal with the flanged margins 37 of the still wall and with an interposed gasket of suitable material, these parts being secured together by bolts or their equivent. A closure plate 47 having a central opening and carrying an outlet conduit 49 in alignment with conduit 43 also is secured to the plate 46 and still 31 by the said bolts. Conduit 49 has a lateral member 51 extending through the wall of the furnace housing. The front end of the furnace has a stack 53 for waste furnace gases. The rear end of the housing is provided at the top with an insulated, removable cap or cover 55 adapted to house the upper end of the still, scrubber and associated parts. The cover 55 is removed whenever the scrubber is taken out for inspection or treatment of the contact material.

For condensing vapors flowing from the still there are provided a series of condensers 57, 59, 61, 62 and 63, so arranged and constructed that the vapors to be condensed flow downwardly in each successive condenser. Liquids condensed in the respective condensers flow from the lower outlets thereof into corresponding receivers 65, 67, 69, 70, 71 through valve-controlled conduits 73, or, alternatively, into auxiliary receivers 75, 77, 79, 80, and 81 through valve-controlled conduits 83 when the main receivers are being emptied. Each of said receivers is connected with a vacuum pump 85 through the conduit 87 and branch-controlled conduits as shown, and each has a valve-controlled liquid discharge line 88.

Vapor conduits 89 connect the lower portion of each condenser with the upper portion of the next successive condenser. Valve-controlled vapor outlet lines 91, 92 from the last receivers 71, 81, lead to a vacuum pump (not shown) past valve 93, and conduct uncondensed gases from the system. Alternatively, when inert gases are recirculated in the system for their partial pressure effect in the still, valve 93 is closed, and a gas circulating pump 94 conducts the said gases to the spray nozzle 35 in the still, from lines 91, 92, through valve-controlled lines 96, 98, or from a source of supply of the said gases through line 100. The line 98 passes through the furnace where the recirculated gases are again heated; and the line conducts the heated gases to the still and discharges them into the latter through an annular passage 101 surrounding the nozzle 35.

For preparing and pretreating the solution of organic material to be distilled, there is provided a vessel 95 having an inlet line 97 for the crude material and solvent, and a bottom outlet line having a valve-controlled waste discharge line 99, and a solution discharge line connected with a second vessel 103 by a valve-controlled conduit 104 having therein a pump 105. A liquid outlet line 107 from vessel 103 has therein a valve-controlled waste discharge line 109 and a pump 111. Line 107 is connected with the upper inlet end of condenser 63, the construction of the latter being such that the liquid from line 107 flows downwardly and then upwardly through the tubes therein in indirect heat-exchange relation with the vapors flowing through the condenser from the still. The thus-heated liquid then flows successively through the lines 113 to the other condensers of the series, and finally flows from condenser 57 through line 115 to the preheater 29. A valve-controlled line 117 leads liquid from the preheater to the liquid inlet line 33 at the still. Valve-controlled bypass line 116 permits bypassing of any condenser by any part or all of the liquid, when desired. A valve-controlled branch line 119 connects the line 115 directly with the inlet line 33 and permits bypassing the preheater by any or all of the liquid, where this is advantageous. The spray nozzle 35 is adapted to introduce the liquid into the still in finely divided form under any selected pressure.

For removing from the still any unvaporized liquid in the event it should accumulate, a drain line 123 connects the bottom of the still with a receiver 124 and auxiliary receiver 125, each of the latter being connected with the vacuum line 87 as shown. For removing from the bottom of the scrubber 38 any coalesced mist or unvaporized liquid formed in the still and caught in or on the scrubber contact material a conduit 127 connects the scrubber bottom with the drain line 123. A baffle 128 in the housing near the upper portion of the still directs the hot furnace gases around the rear end of the still and scrubber to maintain the same at uniformly high temperatures. By regulating the dampers 15, 17, the hot gases may be directed as desired over the preheater and/or over either or both of the respective ends of the still.

Although the scrubber 38 may function as a filter for removing any filterable material present, that is not its primary purpose. In fact the usual finely divided filtering materials such as fuller's earth, kaolin, absorbent clays, and the like, tend to obstruct the rapid flow of vapors through and out of the high temperature scrubbing zone wherein unvaporized particles are coalesced. This is due to the relatively low percentage of voids present therein, as distinguished from glass wool, steel wool, glass beads, pieces of earthenware and the like employed by applicant as coalescing media. In the claims, the term "solid scrubbing medium having a high percentage of voids" and similar terms refer to coalescing media of the latter type, which allows free flow of the vapors through and from the hot scrubbing zone. In one instance, utilizing the apparatus described for distilling a 20% solution of rosin and fatty materials in naphtha having a boiling range, between 150° C. and 205° C., excellent results were secured in a distillation conducted at temperatures within the range from 260° C. to 275° C., under a vacuum of 28 inches of mercury, using in the scrubber a 24 inch depth of glass wool having over of 50% voids.

In the practice of the invention, utilizing the apparatus of Fig. 1, the heat-sensitive organic materials to be distilled are introduced into the vessel 95 together with the desired amount of the solvent, which is thoroughly mixed therewith. The solution then is treated with around 2 to 6% of concentrated sulphuric acid in well-known manner in order to remove objectionable unsaturated bodies. The mixture in vessel 95 is settled, and the water and sludge are withdrawn through line 99. The residual liquid in the vessel is then washed with water, the washings also being removed through line 99. The washed solution is then pumped into storage tank 103. From there it is pumped by pump 111 to the preheater 29, passing successively through each of the condensers 63, 62, 61, 59, and 57. Any or all of the condensers may be bypassed, if desired, through lines 116. The preheated solution flows from the preheater to the spray nozzle 35 through line 117 controlled by valve 130. The valve-controlled bypass line 119 permits the cooling or dilution when desired of the preheated solution flowing to the still. The vapors and atomized liquid particles formed in the still are quickly drawn into the hot scrubber through its open upper end, and thence pass downwardly through the contact material to the scrubber bottom where the vapors abruptly change direction. Any coalesced liquids impinge or are deposited upon the said bottom, the hot stripped vapors being rapidly withdrawn from the scrubber through lines 43, 49, and 51. Then they enter the condenser system, through which they pass in obvious manner, the vapors flowing downwardly in each condenser, so that any condensate flows in the same direction as the uncondensed vapors, and does not interfere with the free flow of the latter. The liquids condensed in the respective condensers flow downwardly to the receivers associated therewith, from which they can be withdrawn as desired. The vacuum pump 85 serves to vacuumize the receivers and the residue storage tanks 124—125 after the latter have been cut off the line for discharge of their contents, and before again cutting them into the system. Thus are prevented all substantial variations in the vacuum maintained in the main still-condenser system, such as occur when unvacuumized vessels are connected with such system and which would produce uncontrollable variations in the products being formed in the still, and in the fractions being condensed in the respective condensers.

Figures 2, 3, 9, 10:
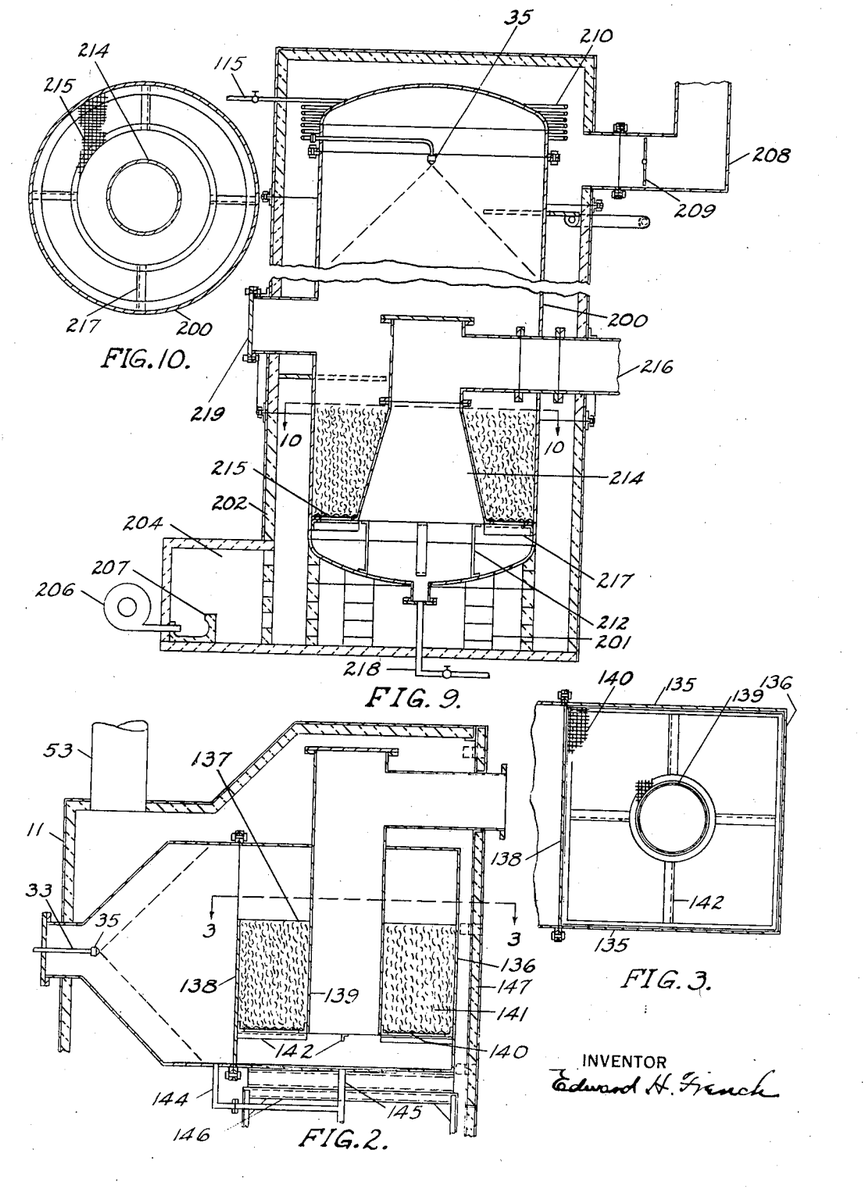
Fig. 2 is a fragmentary longitudinal section through one form of still-scrubber assembly and associated parts, portions being broken away.
Fig. 3 is a vertical section taken along the line 3—3 of Fig. 2, looking in the direction of the arrows.
Fig. 9 is a vertical section through a vertically-disposed still-scrubber assembly and associated parts, portions being broken away.
Fig. 10 is a transverse section taken along the line 10—10 of Fig. 9, looking in the direction of the arrows.

Figs. 2 and 3 show another type of still, similar in general to that of Fig. 1, but in which the still and scrubber are square in transverse cross-section. In this modification the scrubber 137 is in the rear end section of the still, and is formed by the side walls 135 and rear end wall 136 of the still, and a front wall or baffle member 138 which makes a fluid-tight joint with the still bottom and which extends upwardly to a point spaced from the still top so as to permit free access of vapors in the still to the upper end of the scrubber. The latter is separated into an inlet or contact compartment and an outlet compartment by the outlet line 139 having a flanged lower end cooperating with a flange in the inner wall of the scrubber to support a screen or screens 140 carrying a body of mineral wool or other mist-coalescing solids, 141. Supporting members 142 secured to the still wall and to line 139 reinforce the screens. Liquid drain lines 144, 145, respectively connect the still and scrubber with receiver 124. (See Fig. 1.) The scrubber section of the still is removable from the furnace, being slideable on tracks 146, through a removable rear wall section 147 of the furnace housing.

Figures 4, 5, 6, 7, 8, 11, 12, 13, 14, 15:
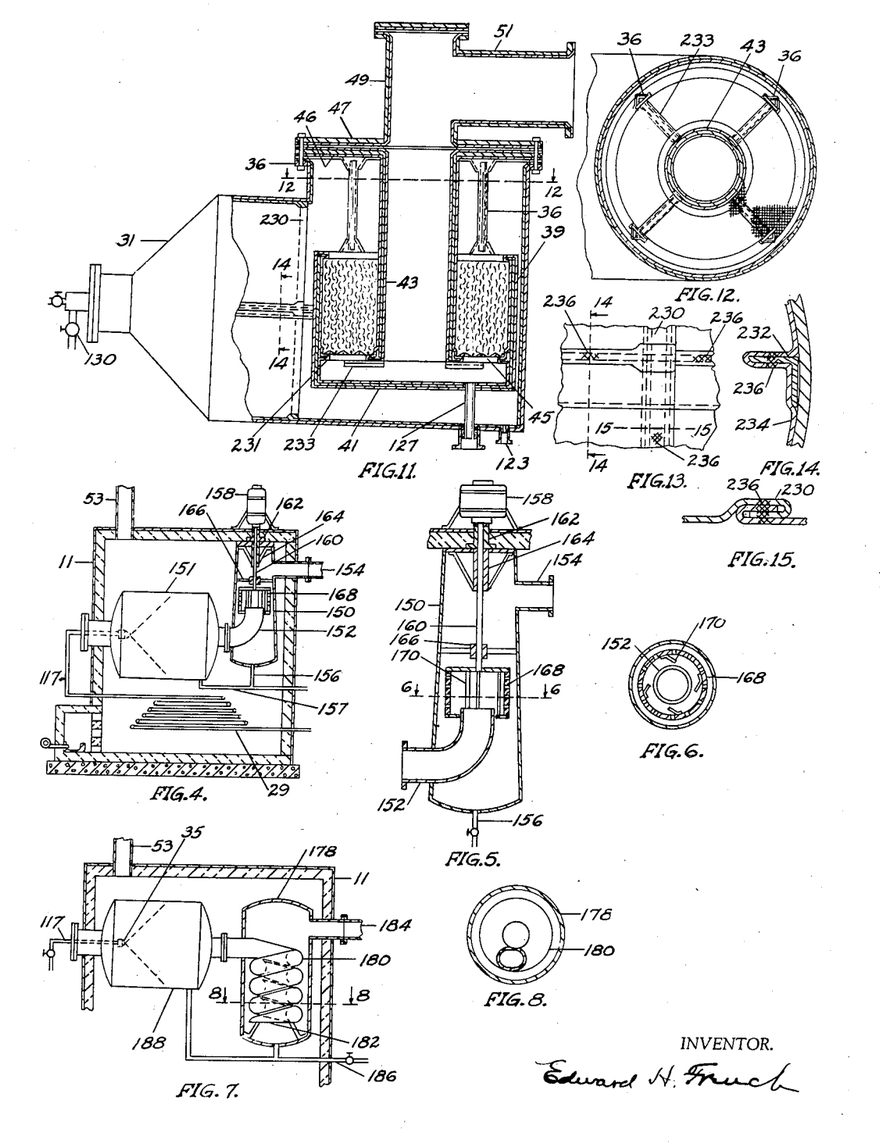
Fig. 4 is a longitudinal section through another form of still-scrubber assembly and associated parts, parts being omitted.
Fig. 5 is a longitudinal section through the scrubber of Fig. 4, on an enlarged scale.
Fig. 6 is a transverse section taken along the line 6—6 of Fig. 5, looking in the direction of the arrows.
Fig. 7 is a fragmentary longitudinal section taken through another form of still-scrubber assembly, parts being omitted.
Fig. 8 is a transverse section taken along the line 8—8 of Fig. 7, looking in the direction of the arrows.
Fig. 11 is a view somewhat similar to Fig. 2, of a modified form of still-scrubber assembly, parts being broken away, showing the lining of corrosion-resistant metal.
Fig. 12 is a transverse section taken along the line 12—12 of Fig. 11, looking in the direction of the arrows.
Fig. 13 is a fragmentary view of the face of a portion of the inner lining of the still of Fig. 11, on an enlarged scale.
Fig. 14 is a section, on an enlarged scale, taken along the line 14—14 of Fig. 11, looking in the direction of the arrows.
Fig. 15 is a transverse section on an enlarged scale, taken along the line 15—15 of Fig. 13.

Figs. 4 to 6 illustrate a form of the invention that is especially adapted for use in operations conducted at or around atmospheric pressure, and where inert gases are introduced into the still to facilitate operations at low temperatures obviating decomposition of the material being distilled. Here a scrubber 150 is mounted wholly within the furnace housing 11. The scrubber communicates with the outlet end of the still 151 through conduit 152, which extends within the scrubber and has its discharge end centrally disposed therein and directed upwardly. The scrubber has a vapor outlet 154 in the upper end. Liquid drain lines 156, 157, lead respectively from the bottoms of the scrubber and still to a suitable container, such as the receiver 124 (Fig. 1). The side walls of the scrubber 150 slope outwardly in a downward direction, so that any liquid particles impinging thereon freely flow to the drain line. Mounted upon the furnace housing is an electric motor 158, the armature shaft of which has an extension 160 extending through bearings carried by suitable bushings 162, 164, carried in the furnace wall and in the top of the scrubber. The extension also is provided with a central bearing carried by a centering spider 166 secured to the scrubber wall. A hollow cylindrical baffle number 168, having an imperforate top and a central opening in its bottom to accommodate the conduit 152, is secured to the lower end of shaft 160 for rotation with the latter. The side walls of the number 168 are foraminous, and have secured thereto vertically disposed angle members 170 adapted during rotation of the number 168 to impact the vapors and mist entering from conduit 152 and to discharge them laterally at high velocity against the walls of the rotating member 168 and of the scrubber 150. The other parts of the furnace and associated parts are in general the same as shown in Fig. 1. During operation the centrifugal action of the rapidly rotating member 168 causes the vapors and suspended liquid particles to impinge upon the heated walls of the scrubber where any liquid particles coalesce, and the resultant liquid stream flows to the drain line 156 and is removed. The stripped vapors thus freed from liquids and while still at high temperatures are rapidly withdrawn and flow to the first condenser of the series hereinbefore described.

Figs. 7 and 8 illustrate still another form of distillation apparatus having the scrubber or its equivalent in the high-temperature distillation zone. Here the hot vapors leaving the atomizing nozzle 35 of the still enter the scrubber chamber 178 through the spiral conduit 180. The latter is disposed longitudinally of the scrubber and discharges fluids downwardly to a bottom outlet 182 spaced from the bottom of the scrubber chamber, the hot vapors and suspended liquid particles being subjected to a centrifugal action as they flow downwardly to the bottom outlet 182, from thence they rise upwardly outside of the conduit 180 under action of the main vacuum pump connected with the last condenser 63 (see Fig. 1), and are quickly removed from the high-temperature distillation zone, through outlet 184. Particles that are liquid at the temperatures within the scrubber 178 are coalesced on the bottom of the scrubber and are withdrawn therefrom through valve-controlled drain line 186, which line also drains any liquid deposited in the still 188.

Figs. 9 and 10 illustrate another type of still-scrubber assembly. Therein, the still 200 is mounted vertically upon checker work 201 within the furnace housing 202. The latter is heat-insulated and is provided with an auxiliary combustion chamber 204 having one or more burners 206, and a baffle 207 to prevent direct flames from striking the bottom of the still. The flue gases leave the furnace through stack 208 having the damper 209. Surrounding the upper portion of the still 200 is a preheating coil 210 functioning similar to the preheater 29 of Fig. 1. The inlet end of the coil is connected with line 115 (see Fig. 1), and the outlet end is connected with the atomizing nozzle 35. The latter is directed downwardly to discharge highly heated vapors and mist towards the bottom of the still. Supported upon the sloping bottom of the still by members 212 and disposed vertically within and axially of the still is a vapor outlet member 214 of generally frusto-conical shape, spaced from the side walls of the still. An outlet line 216 is connected with the outlet of member 214 for conducting vapors therefrom to the series of condensers described in connection with Fig. 1. The lower margin of member 214 has a flange cooperating with a similar flange on inner wall of still 200 to support screens 215 that support a bed of solid contact or scrubbing material of the kind heretofore described. Radial supports 217 connect the said supporting flanges. In this modification, the rate of flow of the atomized material within the still increases during its flow through the contact material. This, together with the abrupt change of direction of the vapors leaving the scrubber, and the slight reduction in their rate of flow at this point in their path, facilitate complete removal therefrom of all liquid components that otherwise would impart undesirable color to the condensate subsequently produced from the vapors. Any liquids deposited in the still or scrubber bottom are withdrawn through valve-controlled line 218. A removable closure 219 in the side wall of the still permits inspection of the inside of still and scrubber, and the treatment or removal of the scrubber material when desired.

Figs. 11 to 15 illustrate forms of the invention involving the employment of a relatively thin lining of corrosion-resistant metal for all parts coming in contact with hot fluids capable of corroding the usual ferrous metals. Preferably those apparatus elements exposed to high temperatures, such as those around 260° C. or above, are constructed entirely of corrosion-resistant metals or alloys such as nickel, stainless steel of the 18% Ni 8% Cr type, or Monel metal, while the elements exposed to lower temperatures, such as the condensers, pipes carrying cool liquids, etc., may be made of these metals or of aluminum. However the cost of the large quantity of these metals required for apparatus constructed entirely therefrom is very great.

Applicant also has made the surprising discovery that it is possible to obtain the desired corrosion-resistance and long life for this type of apparatus made of the ordinary grades of steel and like ferrous metals and alloys and designed to be exposed to corrosive fluids, by securing upon the exposed surfaces of the apparatus a thin sheet lining of the said corrosion-resistant metal having unwelded, uncaulked joints. The lining may be secured to the adjacent walls of the element being lined therewith by any suitable means, such as by spot-welding, or by bolting together flanged margins thereof. Still more surprising and unpredictable is applicant's discovery, now fully demonstrated, that it is possible, by proceeding in the following manner, so to secure such thin metal inner lining upon the metal part to be protected that, although secured to the said part at only a limited number of spaced points, yet over long periods of service it successfully resists all forces acting upon it to induce its collapse, even when a high vacuum is maintained on the still or other vessel thus lined. At the same time this lining definitely prevents the corrosive fluids from reaching the corrodible metal walls of the vessel so lined.

In affixing the metal lining to the vessel, sections of the thin sheet metal lining having lapped margins are joined together when in place in the vessel by having their lapped ends interlapped together, as shown in Fig. 15, after which the parts forming the lapped assembly are pressed or impacted together to produce the type of joint ordinarily known as a "tinner's lap." At spaced points along the line of these seams, as well as at other points in the lining, the same may be secured to the base metal of the vessel by spot-welding, by bolts of corrosion-resistant metal, or the equivalent. When linings are bolted in place, the inner surface of the vessel to be lined preferably is provided with angle members to which the lining may be secured as shown in Fig. 14, in which case the lapped joint formed in the lining is not located in the said angle member. High vacuum fails either to dislodge or otherwise injure the lining, and the interior surface of the vessel is fully protected from corrosion.

Fig. 11 illustrates a still-scrubber assembly having inner linings of the type described. As shown, all parts coming in contact with hot vapors are lined or covered with sheets of corrosion-resistant metal secured in place in the manner indicated. Such parts include the still, scrubber, vapor outlet conduits 43, 49 and 51, and the respective supporting members 240 and 233 for the scrubber and the screen 45. A lapped joint in the metal lining is indicated at 230 in Fig. 11, and on a somewhat larger scale in Figs. 13 and 15. The open-topped scrubber 39 is supported upon the cover plate 46 by the spaced vertical angle members 240. Secured to the scrubber walls are flanged supporting members 231 that cooperate with flanges on the lower end of outlet line 43 to support transverse members 233 carrying the screens 45. Fig. 14 shows a fragment of a still wall having suitably secured thereto a flange member 232. A lining sheet 234 of corrosion-resistant metal covers the inner wall surface and the flange 232. The lining is secured to the said flange by spaced spot welds 236. Both inner and outer surfaces of the scrubber and of the vapor conduit 43 are thus lined.

Thus it is seen that the distillation apparatus of the invention essentially includes an assembly of heated units, comprising a preheater, a spray vaporizing still, a contact separator or scrubber, and a vapor outlet conduit, all disposed within a unitary heat-insulated furnace housing that is provided with means for producing and distributing a high temperature heating medium to selected parts of the said assembly. The scrubber is removably mounted within the furnace housing and can be withdrawn or reached for replacing or cleaning the contact material. Thus, the top part 55 of the housing can be removed, whereupon the scrubber can be disconnected from the still and removed overhead. On the other hand, the still of Fig. 9 is provided with a removable closure in its side wall for use in cleaning or replacing the contact material.

Moreover the process features of the invention essentially comprise spray-vaporizing or atomizing a solution of a heat-sensitive organic material within a hot zone maintained at a temperature approximately as high or higher than that which the said solution possesses immediately prior to its atomization. The vapor mixture thus formed is quickly drawn from the still after passing through a scrubber or contact mass which offers little or no resistance to the passage of the true vapors but which causes coalescence of finely divided liquid or solid particles, thereby forming aggregates of a size and weight sufficient to render them quickly and easily removable from the hot vapor stream when the latter is forced to change its direction suddenly while at the said high temperature. Thereafter the vapors are rapidly removed from the still to the condensing and collecting system, where the rosin, fatty acids, and solvent are successively condensed by heat-exchange with the solution of crude charge liquor flowing to the preheater or heat-exchange 29.

Preferably the coalesced liquid is removed from the vapor stream with the assistance of gravity or of regulated centrifugal force applied adjacent the vapor outlet from the still. The more quickly these stripped vapors are removed from the high temperature zone within the furnace housing, the purer and freer from color bodies and other impurities will be the distillates subsequently formed. A countercurrent liquid-vapor contact device, such as a dephlegmating column is unsuitable for the treatment of the hot vapors where highly pure distillates are desired. The requisite high speed of atomized vapors through and from the high temperature zone of the still scrubber assembly preferably is effected under high vacuum or by the use of a rapidly recirculated stream of inert gas. This high speed flow further is facilitated by passing the vapors downward through each of the condensers and removing condensate therefrom in the direction of the flow of the vapors.

The novel method hereindescribed for applying to a metal surface of a vessel or conduit a sheet metal lining of corrosion-resistant metal is of important value in making practicable the commercial development and use of small, relatively inexpensive distillation units adapted for satisfactory and economical service where the amount of materials to be refined is limited, or where the need for distillation is intermittent. The lining, although held in place at a limited number of points, and while having joints or seams that need not be gas tight, not only resists all forces acting to collapse it, but actually prevents passage of corrosive liquids and distilled vapors into contact with the corrodible metal wall of the still or other device thus lined.

By the term "mechanically coalescing and stripping" and similar terms set forth in the claims, I refer to the removal of non-vaporized and/or non-vaporous components from vaporous components by use of suitable mechanism such as solid scrubbing media of the type described, and equivalent mechanism such as the centrifugal separator shown in Figs. 4 to 8. The term "indirect heat" is used in the claims in its usual sense to designate heat applied from an external source in such manner that the heating fluid is not directly mixed with the vapors being heated, and does not dilute the latter.

This application is a division of my copending application for "Distillation process and apparatus" filed August 5, 1937, Serial No. 157,561, now matured as Patent No. 2,278,543.

Variations may be resorted to within the scope of the following claims without departing from the spirit of the invention.

I claim:

1. Distillation apparatus, comprising a heating chamber; a distillation vessel disposed within said chamber and having a vapor outlet; means for spray-atomizing within said vessel a fluid to be distilled, means for withdrawing distilled vapors from said vessel through said outlet; and means operatively associated with said vessel and interposed between the said atomizing means and said vapor outlet and completely housed within said heating chamber and adapted to coalesce and strip from the high temperature vapors flowing to said outlet unvaporized liquid and solid components and to prevent countercurrent contact of the vapors and unvaporized components stripped therefrom while present in said distillation vessel.

2. Apparatus as defined in claim 1 together with a vacuum means connected with said vapor outlet and adapted to maintain a vacuum within said distillation vessel.

3. Apparatus as defined in claim 1 wherein a centrifugal stripping means is employed.

4. Distillation apparatus, comprising a furnace having a preheating chamber and a main heating chamber; means for controlling the direction of heat flow within the main heating chamber; a distillation vessel disposed in the main heating chamber; spray-atomizing means in one end of the said distillation vessel; means operatively associated with the said vessel and completely housed within the said furnace and adapted to coalesce and strip from the vapors leaving the said atomizing means unvaporized liquid and solid components while preventing countercurrent contact of the vapors and unvaporized components stripped therefrom; and means for withdrawing stripped vapors from the distillation vessel.

5. Apparatus as defined in claim 4, including a series of condensers connected with said distillation vessel and said coalescing and stripping means, and means for circulating a stream of inert gas through the distillation vessel, stripping means and series of condensers.

6. Apparatus as defined in claim 4 wherein the coalescing and stripping means comprises a body and inert inorganic material having a high percentage of voids and offering little resistance to vapor flow therethrough.

7. Apparatus as defined in claim 4 wherein the coalescing and stripping means comprises a body of fibrous inorganic material having a high percentage of voids.

8. Apparatus as defined in claim 4 wherein the coalescing and stripping means is housed within the distillation vessel and includes a centrally-disposed vapor outlet conduit having an inlet end disposed adjacent the outlet from the coalescing and stripping means but spaced at a lower elevation than the latter.

9. Apparatus as defined in claim 4 including a series of condensers connected with the outlet from said still and said coalescing and stripping means; and means for circulating a stream of inert gas through the distillation vessel, coalescing and stripping means and series of condensers; the said coalescing and stripping means comprising a centrifugal liquid-vapor separator, and means for regulating the separating capacity of the said centrifugal separator.

10. Apparatus for distilling high-boiling heat-sensitive liquids, comprising, respectively within a heat-insulated furnace housing, a preheater, an atomizing chamber, means for heating the said heat-insulated furnace housing, and means for coalescing and stripping from vapors leaving the said atomizing chamber entrained liquids and solids in suspension therein while preventing countercurrent contact of the stripped vapors and the coalesced liquids and solids.

11. Apparatus as defined in claim 10 wherein the said coalescing and stripping means comprises a chamber mounted in the said atomizing chamber and having an inlet adapted to direct incoming vapors downwardly, means in the lower portion of the said coalescing and stripping chamber adapted to support a contact body of mineral wool having a high percentage of voids; and a vapor outlet conduit having its inlet end disposed below the level of said supporting means, and adapted to conduct stripped vapors upwardly from said chamber.

12. Distillation apparatus for the refining of heat-sensitive hydrocarbon oils, which comprises a furnace housing; a still and a preheater in said housing; means for atomizing a volatilizable liquid within the said still; means for heating the furnace and the elements therein to a selected high temperature; a vapor treating unit within the said housing and having a vapor inlet in permanent communication with the said still and adapted to discharge vapors within the said unit; means associated with the treating unit and disposed within said housing for coalescing finely-divided liquid and solid particles in the vapors thus discharged and for separating the same from the vapors; means within the furnace for conducting the resultant stripped vapors from the coalescing means; a series of condensers connected with the last-named conducting means; and vacuum means for withdrawing the stripped vapors from the coalescing and stripping means through the said series of condensers.

13. Apparatus for refining hydrocarbon oils, which comprises means for preheating a flowing body of such an oil containing a lubricating fraction to a distillation temperature below that at which it is substantially decomposed; a furnace; a distillation chamber housed within said furnace; means for atomizing the preheated oil within said chamber; means for maintaining said chamber at a temperature approximating that of the preheated oil; means for regulating the vapor pressure of the said oil within said chamber; means within the furnace for quickly coalescing and removing from the resultant vapor stream non-vaporized liquid and solid components present therein and for maintaining the stripped vapors at the said high temperature, the last-named means not materially retarding the rate of flow of the vapors within the said chamber; means for quickly removing the stripped vapors from said chamber; and means for separately condensing from the stripped vapors a lubricating fraction of the oil thus refined.

14. Distillation apparatus, comprising a furnace having a preheating chamber and a main heating chamber; means for controlling the direction of the flow of heat within the main heating chamber; a distillation vessel disposed in the main heating chamber; fluid atomizing means in the said distillation vessel; means operatively associated with the said vessel and completely housed within the said furnace, and adapted to coalesce and strip unvaporized liquid and solid components from vapors leaving the said atomizing means, while preventing countercurrent contact of the vapors with the unvaporized components stripped therefrom; means for withdrawing stripped vapors from the said stripping means; and means for fractionally condensing the stripped vapors, the last-named means comprising a series of condensers, and means for flowing the vapors to be condensed downwardly within each of the condensers and for removing the condensate from the vapors in the direction of flow of the latter, in the absence of countercurrent contact of the vapors and condensate.

15. Apparatus for distilling hydrocarbon oils comprising within a heat-insulated furnace housing, means for heating said housing, a preheater, an atomizing chamber, means for coalescing and stripping from vapors leaving said atomizing chamber entrained liquids and solids in suspension therein while preventing countercurrent contact of the stripped vapors and the coalesced liquids and solids, and means for selectively regulating the flow of heat from said heating means respectively to the said atomizing chamber and to said coalescing and stripping means.

16. Distillation apparatus for the refining of heat-sensitive hydrocarbon oils, which comprises a furnace housing; a still and a preheater in said housing; means for atomizing a volatilizable liquid within said still; means for heating the furnace and the elements therein to a selected high temperature; a vapor treating unit within said housing and having a vapor inlet in permanent communication with said still and adapted to discharge vapors within the said unit; means associated with said treating unit and disposed within said housing for coalescing finely divided liquid and solid particles in the vapors thus discharged and for stripping the same from the vapors; means within the furnace for conducting the resultant stripped vapors from said coalescing and stripping means; a series of condensers connected with the last-named conducting means; and means for withdrawing the stripped vapors from the coalescing and stripping means through said series of condensers, said withdrawing means including an inert gas recirculating system comprising a conduit connecting the last condenser of the series with said atomizing means, and a pump in said conduit having its inlet in communication with the last condenser of said series, and having its outlet in communication with said atomizing means.

17. Apparatus as defined in claim 16, wherein a portion of said conduit is disposed within said furnace housing.

EDWARD H. FRENCH.